Aug. 25, 1936.   A. B. WEBB   2,052,152
TORQUE TRANSMISSION MECHANISM
Filed May 19, 1932   6 Sheets-Sheet 1

INVENTOR
ARTHUR B. WEBB
ATTORNEY

Aug. 25, 1936.  A. B. WEBB  2,052,152
TORQUE TRANSMISSION MECHANISM
Filed May 19, 1932  6 Sheets-Sheet 4

INVENTOR
ARTHUR B. WEBB
BY
ATTORNEY

Aug. 25, 1936.    A. B. WEBB    2,052,152
TORQUE TRANSMISSION MECHANISM
Filed May 19, 1932    6 Sheets-Sheet 5

INVENTOR
ARTHUR B. WEBB
BY
ATTORNEY

Aug. 25, 1936.　　　A. B. WEBB　　　2,052,152
TORQUE TRANSMISSION MECHANISM
Filed May 19, 1932　　　6 Sheets-Sheet 6

Patented Aug. 25, 1936

2,052,152

UNITED STATES PATENT OFFICE 2,052,152

TORQUE TRANSMISSION MECHANISM

Arthur B. Webb, Milwaukee, Wis.

Application May 19, 1932, Serial No. 612,172

18 Claims. (Cl. 81—57)

One object of my invention is to provide an improved mechanism for the transmission of rotational force comprising a coupling clutch and automatic means operable to positively disengage the clutch when resistance to rotation reaches a predetermined maximum.

Another object is to provide a portable power tool embodying a mechanism of this character capable of high speed operation and suited for rotating elements such as nuts, bolts, drills and reamers to a predetermined condition of resistance, whereupon the clutch is instantly released without chatter or jarring.

A further object is to provide an improved torque operated clutch releasing mechanism incorporating simple means for adjusting, within a wide range, the maximum torque to be transmitted thru the clutch. Other and further objects will appear from the following specification.

Referring to the accompanying drawings in which like characters designate corresponding parts in all views.

Referring particularly to the device illustrated in Figures 1 to 9, inclusive, 20 and 21, respectively represent castings secured together by means of bolts 22—22 etc., to form a housing for the mechanism. The casting 20 is moulded to provide a hollow handle 23 and is open at its top to receive the shaft of an electric motor 24 which is mounted thereon and suitably secured thereto. The rear portion of the housing is closed by a plate 25 attached by screws 26—26 etc., as illustrated.

Figure 1:
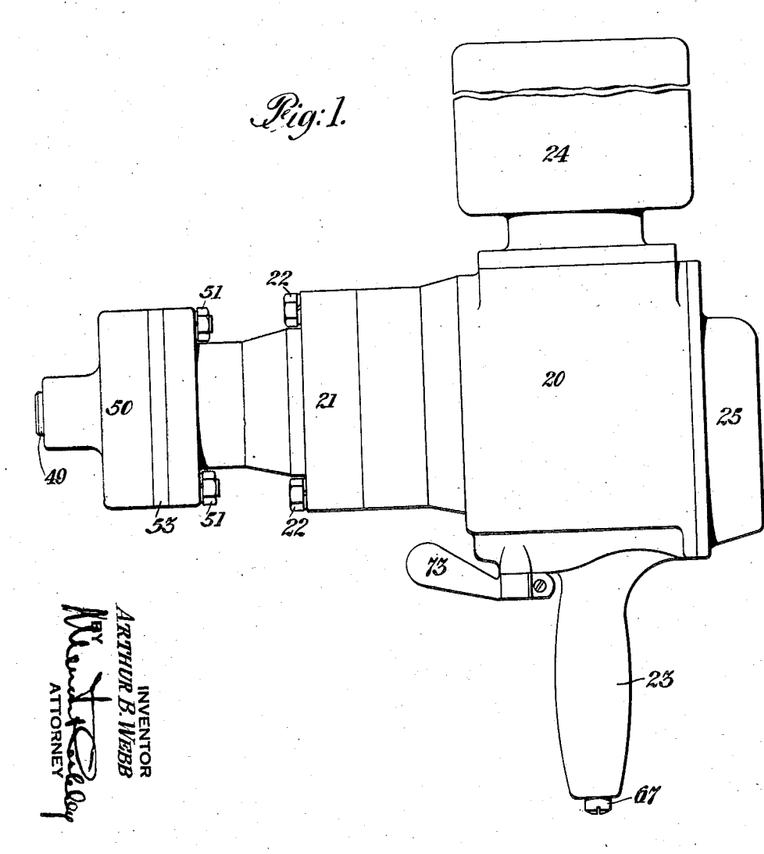
Figure 1 is a longitudinal elevation of a device embodying my invention.
Figure 2:
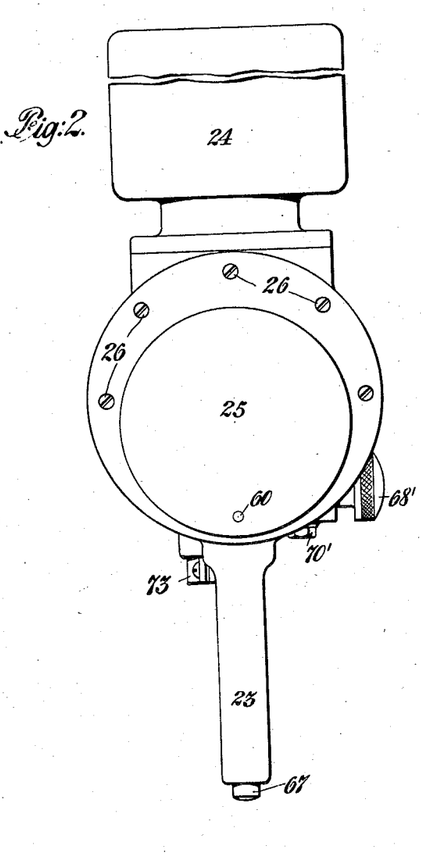
Figure 2 is a rear elevation thereof.
Figure 3:
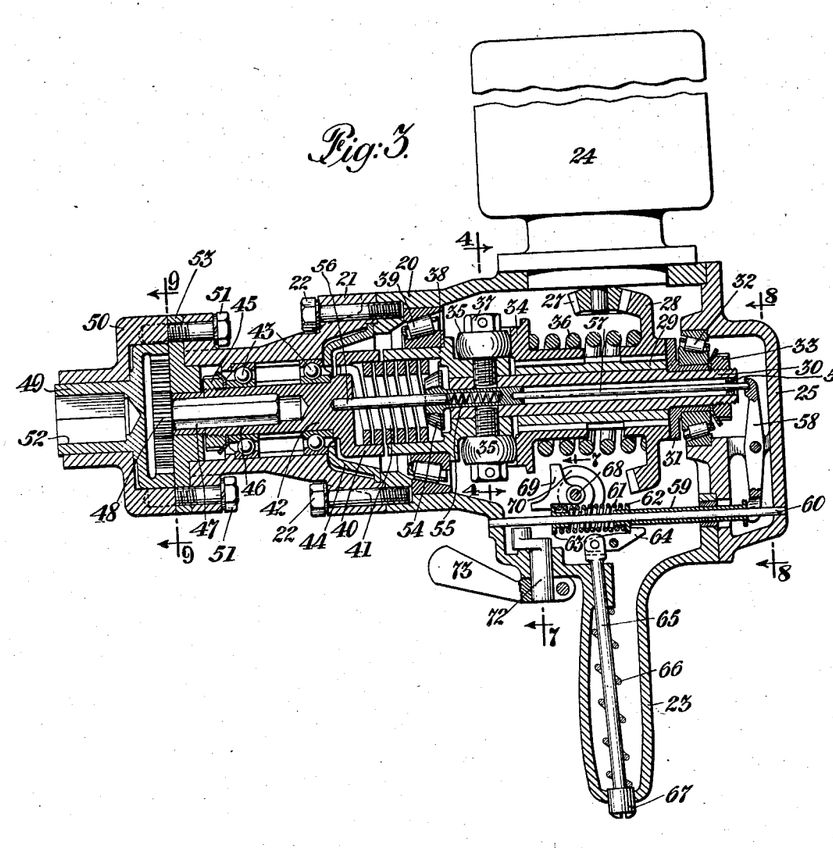
Figure 3 is a longitudinal section thru the device.
Figure 4:
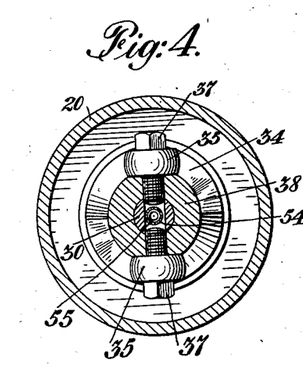
Figure 4 is a sectional view taken on line 4—4 of Figure 3.

Fixed to the motor shaft within the housing is a pinion 27 meshing with bevel gear 28 splined on sleeve 29. The sleeve 29 comprises the torque receiving member of this device and is rotatably supported on a hollow shaft 30. Abutting the rear end of sleeve 29 and the hub of gear 28 is a friction disc 31 fixed to shaft 30 and having a hub rotatably supported in bearings 32, the disc 31 tending to keep the sleeve 29 and shaft 30 turning synchronously together. Nut and washer combination 33 assists to hold disc 31 fast on shaft 30.

The hub of a circular cam element 34 is slidingly splined to sleeve 29 adjacent its forward end. The face of the cam is clearly illustrated in Figures 5 and 6 and is held in yielding abutment with rollers 35—35 by compression spring 36 interposed between it and gear 28.

The spring 36 is carefully selected and compressed to exert a definitely predetermined thrusting pressure against the cam element 34 to hold it in driving engagement with rollers 35. These rollers are rotatable on bolts 37 which also serve to secure driving clutch element 38 to shaft 30. The clutch element 38 is supported in roller bearing 39 and is coupled to the driven clutch element 40 by clutch spring 41 anchored in the driven element. A slight compression of the spring 41 causes it to expand circumferentially and grip the walls of both clutch elements, and release of the force of compression permits the spring to elongate and contract to uncouple the clutch. This is the preferred type of several standard clutch constructions suitable for use here. Torque delivery shaft 42 is formed integral with the driven clutch element and is rotatably supported in bearings 43—43, respectively retained by ring 44 and nut and washer combination 45, as shown.

From the description thus far it will be understood that the hollow intermediate shaft 30 is driven by the sleeve 29 thru cam element 34 and rollers 35, and that the shaft 42 is in turn driven by the shaft 30 thru the spring clutch comprising parts 38, 40, and 41.

Figure 9:
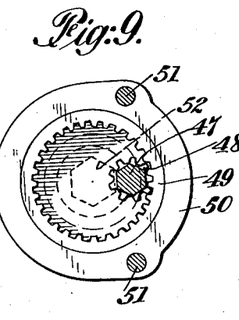
Figure 9 is a view taken on line 9—9 of Figure 3.
Figure 9A:
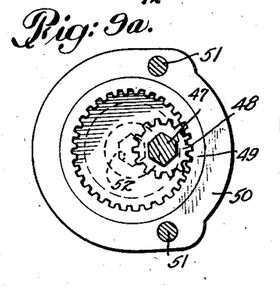
Figure 9a is a view similar to Figure 9 showing a different sized socket member with correspondingly different gearing.
Figures 10, 11, 12:
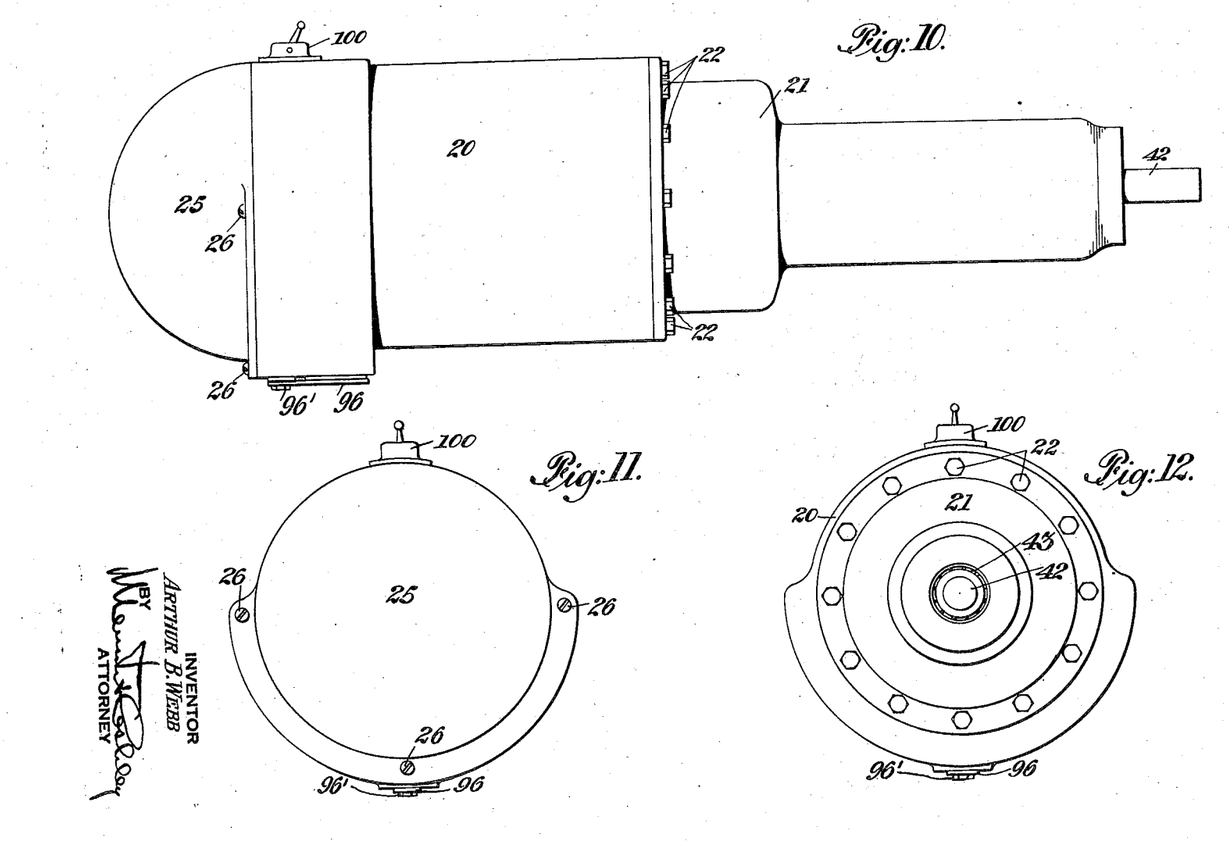
Figure 10 is a side elevation of another device embodying my invention.
Figure 11 is a rear view thereof.
Figure 12 is a front elevation of the device shown in Figure 10.

The outer end of shaft 42 forms the shank of my improved power tool and is provided with a wrench-socket bore 46 adapted to receive and drive a nut, the head of a bolt or the shank of a tool of appropriate size to be rotated by the device, thus providing a driving head. When it is desired to employ the device to rotate elements of a size other than that accommodated by the socket 46, or when it is desired to utilize the device to apply a maximum torque different from that at which the spring clutch is designed to automatically uncouple, as will hereafter be described, I prefer to employ an attachment as illustrated in Figures 3 and 9 in which 47 represents an attachment shank formed to key into the bore 46 and having a gear 48 on its outer end in mesh with a gear carried by extension piece 49.

Extension piece 49 is rotatably held in a head cap 50 attached to the casting 21 by screws 51—51 and is provided with a socket at 52 which may be of any desired shape and size. Between the head cap and the housing, a plate 53 serves to cover the overextending side portions of the extension and its cap. The geared ratio of the extension 49 to the gear 48 on the shank 47 is of considerable practical importance in certain classes of work, as will hereafter appear.

The construction now to be described relates to the clutch operating mechanism. Spring 41 is actuated by a cone 54 having an integral cylindrical shank which extends into the forward end of hollow intermediate shaft 30. A circular bore is formed in the cone and shank, as shown, to contain a light clutch releasing spring 55 and one end of a pillar 56 in abutment with the forward end of the spring, the other end of the pillar being supported in a recess formed in the inner end of the shaft 42.

Bearing in the end of the clutch cone shank is a thrust rod 57 which extends rearwardly thru the shaft 30 and abuts the upper arm of a lever 58 fulcrumed on a web of the plate 25. A bearing piece 57' supports the rod centrally in the bore of shaft 30. It will be noted that parts 54 to 57 inclusive are not made fast in the device or to each other, but are assembled by simple insertion and are capable of relative rotation.

Figure 8:
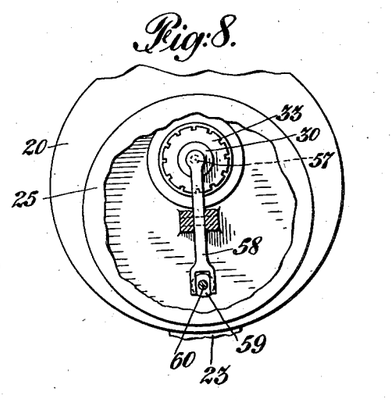
Figure 8 is a view taken on line 8—8 of Figure 3.

The lower arm of lever 58 is bifurcated, as shown in Figure 8, to straddle a rod 60 supported in the housing, and abuts the flanged end of a sliding tube 59 surrounding the rod. A clutch closing spring 61, of substantially greater capacity than the spring 55, also surrounds the rod 60 forward of the tube 59 and is held between end pieces 62 and 63, respectively, slidable on the rod.

A trigger 64, capable of restraining piece 62 from movement to the right, is pivoted on an inner wall of the housing and is actuated by a rod 65 extending downwardly thru the handle 23. A spring 66 serves to normally hold the trigger in restraining position and a button 67 integral with the rod extends externally of the housing at the butt end of the handle, by means of which the trigger may be manually released against the yielding resistance of the spring.

A short shaft 68 having a knob 68' fixed on its outer end is carried in the housing wall by a journal sleeve 70. (See Figure 7). A latch 69, securely pinned on the inner end of this shaft, is provided with a detent positioned to engage end piece 63 and restrain it from leftward movement on rod 60, and has, also, an arm which extends in the sliding path of the cam element 34. Surrounding the shaft 68 is a light torsion spring 71 which is secured at opposite ends to the latch 69 and the journal sleeve 70. This spring serves to yieldingly hold the forward extension of latch 69 downward and is energized by turning journal sleeve 70 which is then held in adjusted position by set screw 70'.

A crank arm 72 is journalled in the housing wall and is turned by means of cocking lever 73 to engage end piece 63 and compress spring 61 into the position shown in Figure 3 so that the end piece may be engaged and restrained by the detent of latch 69, as will be readily understood.

The device operates as follows: The motor 24 runs continuously. As shown in Figure 3, the clutch is open and the closing spring 61 is under compression—in cocked position. The article to be rotated is engaged in socket 52 and button 67 is pressed in to release trigger 64 and permit spring 61 to exert itself against tube 59 and lever 58. The upper arm of the lever is thus caused to thrust the rod 57 and clutch cone 54 to the left and engage the clutch against the resistance of the light spring 55.

The shaft 42 will now continue to rotate in synchronism with the member 29 until sufficient rotational resistance is encountered by shaft 42 to cause relative angular movement of the rollers 35 and the face of the cam. When this occurs, the inclined slopes of the cam are forced to ride over the rollers, axially displacing the cam element 34 against the resistance of spring 36 to trip the latch 69 and thus release spring 61. Thereupon, opening spring 55 instantly forces cone 54 to the right, positively disconnecting the clutch and relieving shaft 42 of all torque.

Before the clutch can again be connected, spring 61 must be restored under compression and confined between trigger 64 and the detent in latch 69. This is readily accomplished by turning crank 72 by means of cocking lever 73 to compress the spring against trigger 64, whereupon latch 69 is returned to its restraining position by spring 71. This restores the mechanism to the cocked position shown in Figure 3. It will be understood that by turning knob 68 against the torque of spring 71, the operator may raise the latch 69 and thus manually disengage end piece 63, should this at any time be desired.

Figure 6:
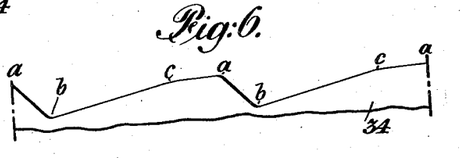
Figure 6 illustrates the developed outline of the cammed face of this element.
Figure 7:
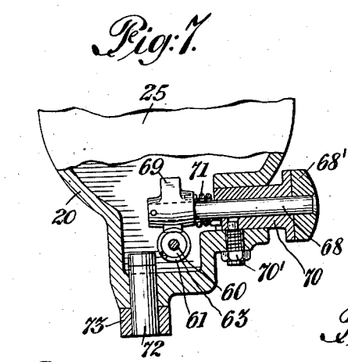
Figure 7 is a section taken on line 7—7 of Figure 3.

The cam 34 has a face shown in its developed form in Figure 6. It is made up of three slopes, one (a—b) at a large angle to the horizontal, one (b—c) at a rather acute angle, and one (c—a) at a very slight angle. The dimensions of the cam with respect to the rest of the mechanism are so proportioned that, with increasing torque resistance, points "c" reach the rollers in forcing the cam element to the right just before its right face makes contact with the arm of latch 69.

After points "c" have ridden over the rollers, the relative rotation is accelerated because of the reduced inclination of the cam surfaces "c" to "a" and a sufficient additional axial movement of the cam element is obtained to cause it surely and quickly to trip the latch. The cam slopes "a" to "b" then ride over the rollers. The resistance requiring torque has been eliminated during this interval, since the clutch has been opened, and the points "b" of the cam face tend to dwell in contact with the rollers after a fractional revolution.

Friction disc 31 comes automatically into play to prevent oscillation of the rollers up and down cam slopes (a—b) and (b—c). This disc is rigidly mounted on intermediate shaft 30 and the bevel gear which drives sleeve 29 bears heavily against it due to the pressure of spring 36, tending to bring shaft 30 carrying the rollers and sleeve 29 carrying the cam into exact synchronism immediately after the clutch releasing mechanism has functioned.

When the device is employed to rotate articles to the predetermined degree of resistance at which the clutch releases, the article to be rotated is engaged directly in the bore 46 and the attachment comprising parts 47, 49 etc., is dispensed with.

This attachment has been found particularly valuable where the device is used to set up nuts of various sizes to a proper degree of tightness. Since such articles are manufactured to standard proportions and it is required to transmit a proportionately greater torque for large nuts than for small ones, I have been enabled to provide systematized sets of attachments, in each of which the ratio of the gears is directly related to the size of the socket 52 in the extension 49. In this manner, a method is provided whereby, in selecting an attachment which will fit the nut he desires to drive, an operator will automatically select a set of gears which will cause the clutch releasing mechanism to function at the optimum torque required to set up the nut to exactly the correct thread pressure.

The gearless power tool illustrated in Figures 10 to 15, inclusive, is constructed to operate in accordance with the same principles applied in the device just described and differs therefrom principally in respect to the means employed for connecting and disconnecting the clutch.

Figure 13:
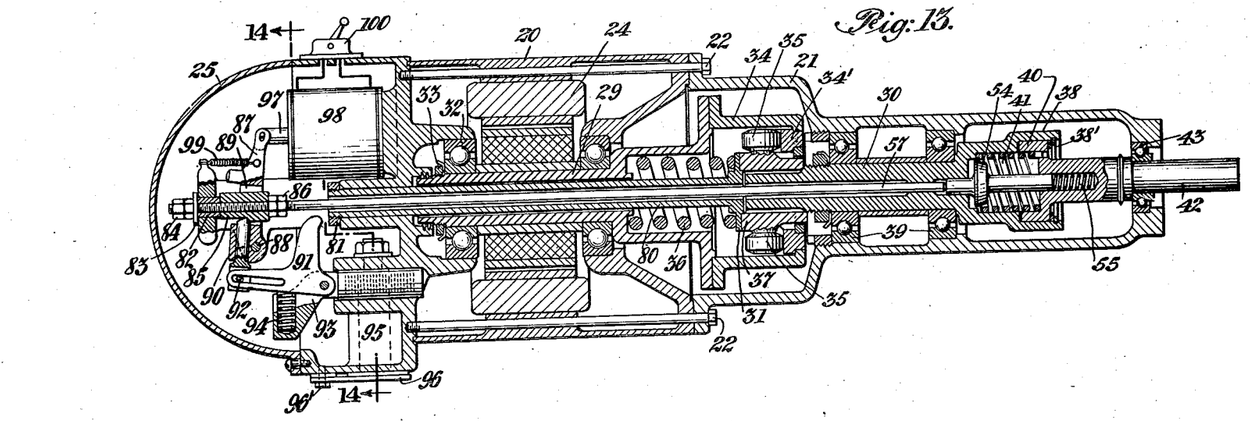
Figure 13 is a longitudinal section thru this device.
Figure 14:
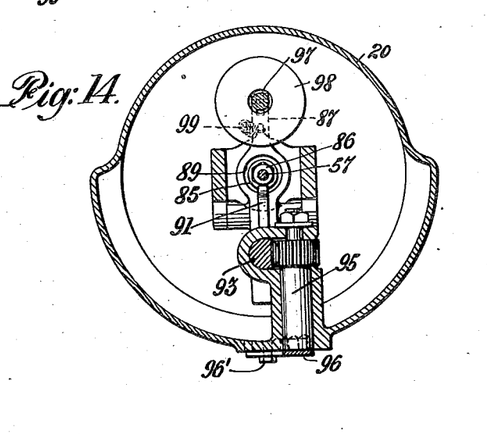
Figure 14 is a sectional view taken on line 14—14 of Figure 13.
Figure 15:
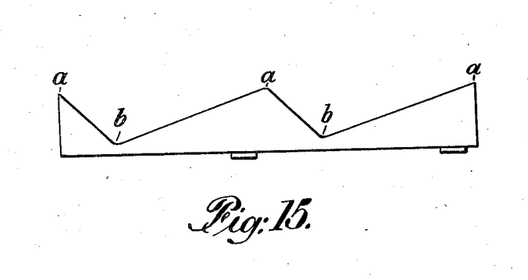
Figure 15 illustrates a modified cam face development suitable for use in the mechanism illustrated in Figures 10 to 14 inclusive.

Referring to Figure 13, it will be noted that the electric motor 24 is here mounted within the housing and that its rotor is fixed directly on driving member 29 which is thereby continuously driven at motor speed when the device is in use. The forward end of member 29 is formed bell-shaped, as shown, to contain compression spring 36. Cam element 34, here formed as a cage, is securely attached to the driving member and carries a circular cam 34', the face of which is developed as illustrated in Figure 15.

Within the cage formed by element 34 and abutting the eccentric face of the cam are rollers 35—35, transversely rotatable on a following piece 37 which is slidably splined to the adjacent end of hollow intermediate shaft 30. The rollers 35 press against the face of the cam 34' due to the compression of spring 36 acting thru the friction disc 31 in abutment with sliding piece 37. Thus it will be seen that in this embodiment of my invention it is the rollers which are capable of axial displacement against the resistance of the spring 36, rather than the cam, as in the device heretofore described.

The shaft 30 extends forwardly thru an opening in the wall of part 34 and has clutch element 38 formed integral on its forward end. Clutch element 40 which is integral on the inner end of driven shaft 42, is coupled to element 38 by spring 41 and retained in position by ring 38'.

In this arrangement, the driving power is transmitted from the torque receiving member 29 to intermediate shaft 30 thru the cam element 34' in engagement with spring loaded rollers 35. The torque delivery shaft 42 is in turn driven by shaft 30 thru the spring clutch comprising parts 38, 40 and 41.

In the drawings the device is shown with the clutch connected to drive shaft 42, the spring 41 being held under the necessary slight compression by cone 54.

A circular bore is formed in the inner end of shaft 42 to contain clutch release spring 55 and the end of a shank formed integral with cone 54 which abuts against the spring. A similar shank extends from the base of the cone to rotatably support it in the bore of hollow intermediate shaft 30.

Friction disc 31 is integral with a tube 80 which extends rearwardly thru compression spring 36 and the hollow driving member 29, and is slidably journalled in a wall of the housing. Thrust rod 57 abuts cone 54 and extends rearwardly therefrom thru shaft 30, disc 31, tube 80 and, finally, thru an angular bracket integral with the housing in which it is slidably supported by a rectangular bearing piece 82.

Nuts 84 and washer 83 hold bearing piece 82 in abutment with a block 85 which serves to limit the rod's movement to the left and which is retained on the rod by nuts 86. A latch 87 is pivoted at 88 on the housing bracket and has an aperture at 89 thru which the block 85 extends. The lower end of the latch arm is provided with a bore communicating with the opening at 89 to receive a latch-piece 90 having a tooth on its upper end engaging a shoulder-like detent formed on the lower side of block 85. The lower end of part 90 is bifurcated to straddle the slotted arm of a bellcrank 91 to which it is linked by a pin 92. Adjustment member 93 pivotally supports bellcrank 91 and carries a latch spring 94 in abutment with the slotted arm of the bellcrank. Member 93 is supported by an integral cylindrical shank which fits into a longitudinal bore in the housing wall. A rack is machined on this shank, the teeth of which are engaged by a pinion carried on torque gauge shaft 95 to adjust the lateral position of bellcrank 91. This shaft 95 extends externally of the housing and is actuated by lever 96 which may be held in any desired angular position by means of set pin 96' insertable into any one of a series of holes drilled in the casing wall to receive it.

Latch arm 87 is pivoted at its upper end on the plunger 97 of a solenoid 98 which is energized thru electric switch 100 to draw plunger 97 inwardly, as shown, against the slight resistance of a retracting spring 99 connected to arm 87 and anchored to the housing bracket.

Resistance to torque encountered by delivery shaft 42 is transmitted thru the clutch to piece 37 and operates to cause relative angular movement between the rollers mounted thereon and cam 34'. In this manner, increasing torque resistance causes the inclined slopes of the cam to climb the rollers and to carry sliding piece 37 and friction disc 31 axially against the resistance of spring 36, ultimately to a degree sufficient to force the nut 81 on tube 80 against the upwardly extending arm of bellcrank 91. The bellcrank is thereby actuated against the resistance of spring 94 to withdraw the tooth on latchpiece 90 from engagement with the detent in block 85, permitting rod 57 to slide to the left under the pressure of opening spring 55. This instantly frees cone 54 from spring 41 and positively declutches shaft 42.

To reengage the clutch, the operator first opens and then closes switch 100. The first action deenergizes the solenoid, whereupon spring 99 draws latch arm 87 to the left, withdrawing solenoid plunger 97 and again latching piece 90 back of the detent on block 85. The second action reenergizes the solenoid to exert a pull on plunger 97 and latch arm 87, the latch-piece on the latter again thrusting rod 57 against cone 54 to engage the clutch and restore the mechanism to the condition shown in Figures 13 and 14.

In this embodiment of my invention, the peaks of the cam do not ride over the rollers and the distance which the cam surfaces "b" to "a" must climb before the clutch releasing mechanism functions is readily adjusted by regulating the position of bellcrank 91 relative to the nut 81 on tube 80, accomplished by means of lever 96. Therefore, it will be seen that I have provided a means for predetermining within a wide range the torque which the mechanism will transmit before the clutch is automatically disconnected.

The device shown in Figures 16 to 19 embodies a modification of my invention which is particularly useful where the torque release mechanism is part of a machine requiring occasional rather than frequent changes in the torque release point and in which the predetermined torque release point is to be varied over an unusually wide range.

Figure 16:
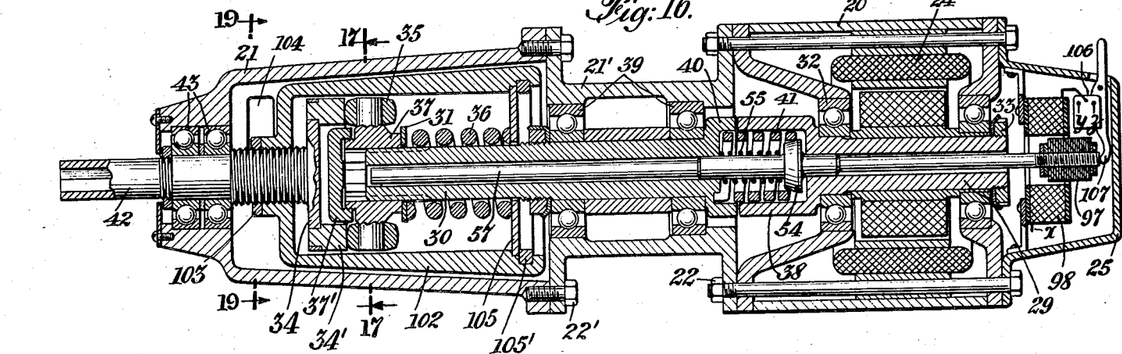
Figure 16 is a longitudinal sectional view of a device embodying a further modification of my invention.
Figure 17:
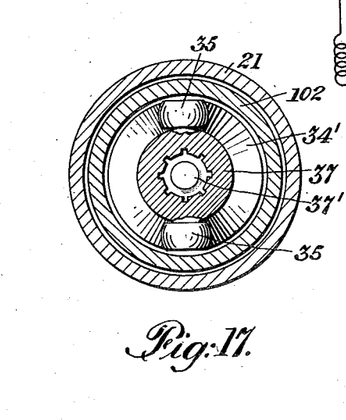
Figure 17 is a sectional view taken on line 17—17 of Figure 16.

Motor 24 is mounted in housing 20. Its revolving element is carried on hollow driving shaft 29, the left end of which is bell-shaped to serve as the driving element 38 of a spring clutch. Intermediate shaft 30, carried in housing 21' by bearings 39, is also a hollow shaft and is bell-shaped at its righthand end to serve as the driven clutch element 40.

Figure 5:
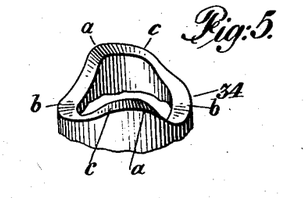
Figure 5 is a fragmental perspective of the cam element employed.

Slidingly attached thru splines to the left end of shaft 30 is member 37 carrying rollers 35 which are forced against the face of the circular cam element 34' by compresion spring 36. The cam element 34' has a face as shown in Figures 5 and 6 and is carried by a cam plate 34 integral with driven shaft 42. Threaded to a leftwardly projecting barrel of member 37 is a striker cup 37'. The exact position of the right face of this cup can be adjusted with reference to member 37 by screwing it to the right or to the left.

A section of driven shaft 42 is threaded and carries a bell-shaped spring cage 102 which may be screwed back and forth on the shaft and held in adjusted position by locknut 103. The righthand end of the cage 102 is closed by a spring plate 105 retained in place by snap ring 105'.

By this construction, spring 36 can be held under any desired degree of compression by adjusting the axial position of cage 102 on driven shaft 42. Such adjustments may be readily made by thrusting an appropriately shaped wrench thru the slot at 104 to first slacken locknut 103 away from cage 102 and then to hold the cage from turning while the shaft 42 is rotated to screw the cage to the desired position. This done, the locknut 103 is again drawn up against the cage.

The clutch operating mechanism consists of a sliding clutch control rod 57 to which clutch cone 54 is firmly attached. Spring 55 surrounds this rod and serves to yieldingly hold the cone to the right, thus normally keeping the clutch in open position, as shown in Figure 16. At the right hand end of rod 57 is attached solenoid plunger 97 concentric in a solenoid coil 98 which, when energized, operates to magnetically attract the solenoid armature leftward to its center of force and thereby close the clutch against the slight resistance of spring 55.

Figures 18, 19:
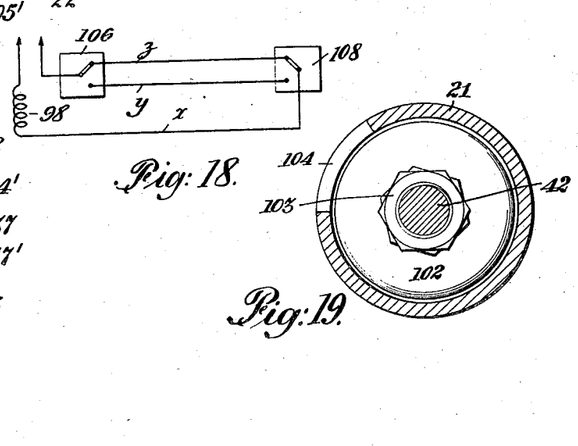
Figure 18 is a diagram of the switch circuit employed in this device.
Figure 19 is a sectional view taken on line 19—19 of Figure 16.

Lever 107 operates a conventional three-point electric switch 106 which coacts with an electrically similar operator's switch 108 connected thereto by a three-conductor cable, the combination providing both automatic and manual clutch control. The circuit connecting the solenoid coil to the source of current supply thru switches 106 and 108 is indicated in Figure 18. The action of switch combinations of this type is such that when contact is broken in one line leading from one switch to the other, the same action establishes contact with the other line leading from the switch.

When the tool is in use, motor 24 runs continuously and when the spring clutch comprising parts 38, 40 and 41 is open, as shown in Figure 16, intermediate shaft 30 and all parts to the left of the clutch are at rest.

To drive a nut or stud which may be engaged in the socketed end of shaft 42, the operator closes switch 108, thus causing current to flow thru solenoid coil 98. Thereupon the solenoid armature is magnetically attracted and forces clutch control rod 57 to the left, closing the spring clutch and causing intermediate shaft 30 to revolve. This leftward movement of the rod 57 carries its left end beyond the left end of the shaft 30. It should also be noted here that electric switch 106 is unaffected by leftward movement at the lower end of switch lever 107.

Since compression spring 36 tends to hold rollers 35 in the valleys of the cam 34', the revolving intermediate shaft 30 which drives member 37 will revolve shaft 42 in synchronism with the motor until the torque resistance encountered is sufficient to cause rollers 35 to climb the slopes of the cam against the adjusted resistance of spring 36 and thereby axially move member 37 and striker cup 37' to the right. The position of striker cup 37' should be so adjusted that it is barely in contact with the clutch control rod 57 when the rollers have climed to points "c" on the cam face (see Figure 6). Therefore, a very slight increase in torque resistance will cause the rollers to ride over points "c" and rapidly to accelerate their rolling movement over the lesser slopes to point "a".

This accelerated relative rotation between the cam and rollers causes sufficient additional axial movement of the member 37 to force striker cup 37' against the left end of clutch control rod 57 to slide the rod to the right. Clutch cone 54 is thus also moved to the right, releasing spring 41 and thereby instantly disengaging the clutch. By the same movement the solenoid plunger is thrust against switch lever 107 to break the circuit energizing coil 98. The magnetic force which has up to this point held clutch spring 41 in its closed position is, therefore, no longer effective.

In this embodiment, disc 31 and spring plate 105 retaining the compressed spring 36, together with snap ring 105' serve importantly as friction pieces to prevent oscillation of the rollers in relation to the cam slopes. The pressure of the spring is exerted at one end against the disc 31 which is in frictional engagement with the member 37 which, in turn, is splined on shaft 30. The pressure of the spring is also exerted at its other end against spring plate 105 which is held by snap ring 105' in frictional relation to the cage 102 attached to shaft 42. The spring 36 bears heavily against disc 31 and plate 105, thus tending to bring shaft 30 carrying the rollers and shaft 42 carrying the cam into exact synchronism immediately after the clutch releasing mechanism has functioned.

It will be understood from the foregoing that whereas spring 55 serves to normally hold the clutch disengaged, it is not required to open it since that is accomplished by the direct force of the cam action operating thru control rod 57 to which clutch cone 54 is attached.

When the operator desires to again start the mechanism, he needs only to operate switch 108, thus reestablishing a circuit thru the alternative line in the three-conductor control cable leading to three-point switch 106.

It is worthy of note that in this construction the clutch is positioned between the driving shaft and the intermediate shaft, while the cam and roller coupling which operates the clutch control means is inserted between the intermediate and driven shafts. This is the reverse of the sequence shown in the devices previously described.

So reversed, I have found the mechanism particularly well suited for classes of work unrelated to that for which the devices here described are designed, such as for feeding the cutting tool of a lathe and driving the lathe itself by means of a suitable power take-off on the intermediate shaft 30. In such an arrangement the torque required to operate the lathe does not affect the clutch releasing mechanism but when the resistance encountered by the cutting tool reaches a predetermined maximum, both the lathe and the cutting tool are instantly uncoupled from the power supply.

Many such changes in arrangement and construction may be made to adapt the mechanism for various uses. I desire to have it understood, therefore, that the devices here shown are merely illustrative and that such changes may be made, when desired, as fall within the scope of the following claims.

I claim:

1. A torque transmission comprising three rotatable members, a coil spring clutch coupling one of said members to another, a circular cam element and a cam engaging element coupling the third member to one of the clutch coupled members, one of said elements being slidable axially on its respective member and yieldingly held in abutment with the other, one of said clutch coupled members being hollow, means extending thru said hollow member for holding said clutch engaged, and means operable by axial movement of said slidable element for releasing said clutch engaging means.

2. A torque transmission comprising two rotatable members, a circular cam element carried by one of said members, an element carried by the other member in engagement with said cam element, one of said elements being slidable axially on its respective member and yieldingly held in abutment with the other, one of said members having a recess, a third member having a recess in alignment with said recess, a coil spring located in said recesses and rotatable with one of said members, an abutment adapted to engage and disengage with a free end of said spring, means extending thru one of said members for holding said abutment in engagement with the spring whereby the spring is caused to engage both recessed members in clutch relation, and means operable by axial movement of said slidable element for releasing said abutment holding means.

3. A power tool comprising an electric motor, a driving head and a transmission therebetween, a casing for said transmission, said transmission comprising two rotatable members, a circular cam element carried by one of said members, an element carried by the other member in engagement with said cam element, one of said elements being slidable axially on its respective member and yieldingly held in abutment with the other, a third rotatable member and a clutch coupling said third member with one of said other members, a spring normally holding said clutch disengaged, means extending exteriorly of the casing for engaging the clutch against the resistance of said spring, a latch carried by the casing for holding said means in clutch engaging position, a trip for said latch, and means operable by axial movement of said slidable element for actuating said trip.

4. A portable power tool comprising an electric motor, a driving head, and a transmission therebetween, said transmission comprising three rotatable members, a helical spring clutch for coupling two of said members, a pair of couplers, one of which comprises a cam, for connecting the third member to one of the clutch coupled members, one of said couplers being axially slidable on its respective member and held in abutment with the other by a spring exerting a predetermined pressure, one of said clutch coupled members being hollow, means extending thru said hollow member for holding said spring clutch engaged, and means extending in the axial path of said slidable coupler for releasing said clutch engaging means, the arrangement being such that a predetermined degree of torque transmission thru said couplers will force the slidable coupler axially against the yielding resistance of said spring to disconnect the clutch.

5. A torque transmission comprising two rotatable members, a circular cam element carried by one of said members, an element carried by the other member in engagement with said cam element, one of said elements being slidable axially on its respective member and yieldingly held in abutment with the other, a friction piece interposed between said members tending to maintain synchronous rotation of said members, a third rotatable member coupled to one of said members by a clutch, and means operable by axial movement of said slidable element for positively disconnecting the clutch.

6. A portable power tool comprising an electric motor, a driving head, and a transmission therebetween, said transmission comprising two concentric rotatable members, a circular cam faced element carried by one of said members, an element carried by the other member in engagement with said cam element, one of said elements being slidable axially on its respective member and yieldingly held in abutment with the other, a third rotatable member and a clutch coupling said third member in axial alignment with one of said other members, a clutch releasing mechanism, and means operable by axial movement of said slidable element for actuating said mechanism.

7. A portable power tool comprising an electric motor, a driving head, and a transmission therebetween; said transmission comprising two concentric rotatable members, a circular cam faced element carried by one of said members, an element carried by the other member in engagement with said cam element, one of said elements being slidable axially on its respective member and yieldingly held in abutment with the other, a third rotatable member and a clutch coupling said third member in axial alignment with one of said other members, a spring normally holding said clutch disengaged, means extending thru one of the clutch coupled members for engaging the clutch against the resistance of said spring, a latch for holding said means in clutch engaging position, a trip for said latch, and means operable by a predetermined axial movement of said slidable element for actuating said trip.

8. A torque applying tool of the character described comprising a casing and two rotatable members carried by the casing in axial alignment with each other, a circular cam faced element concentrically carried by one of said members, a cam engaging element carried by the other member, one of said elements being slidable axially on its respective member and yieldingly held in abutment with the other against axial thrust generated by relative rotation of said members, a third member and a clutch coupling said third member in axial alignment with one of said other members, a spring normally holding the clutch disengaged, solenoid operated means for engaging the clutch against the resistance of said spring, and means operable by resisted axial movement of said slidable element for disconnecting the clutch engaging means.

9. A portable power tool comprising an electric motor, a driving head, and a transmission therebetween, a casing for said transmission; said transmission comprising three rotatable members, a clutch coupling one of said members to another, a cam element and a cam engaging element concentrically coupling the third member to one of the clutch coupled members, one of said elements being slidable axially on its respective member and yieldingly held in abutment with the other, a spring normally holding said clutch disengaged, means for engaging the clutch against the resistance of said spring, a latch for holding said means in clutch engaging position, a trip for said latch, means operable by axial movement of said slidable element for actuating said trip, and means for adjustably positioning the trip in the path of its actuating means.

10. A portable power tool comprising an electric motor, a clutch, and a transmission connected therebetween in axial alignment; said transmission comprising two concentric rotatable members, a circular cam faced element carried by one of said members, an element carried by the other member in engagement with said cam element, one of said elements being slidable axially on its respective member and yieldingly held in abutment with the other; a spring normally holding said clutch disengaged, solenoid operated means for holding the clutch engaged against the resistance of said spring, and means operable by axial movement of said slidable element for releasing the clutch engaging means.

11. A torque transmission comprising two rotatable members, a circular cam faced element carried by one of said members, a cam engaging element carried by the other member, one of said elements being slidable axially on its respective member and yieldingly held in abutment with the other against axial thrust generated by relative rotation of said members, a third member coupled to one of said members by a clutch, a spring normally holding the clutch disengaged, a solenoid for engaging the clutch against the resistance of said spring, and a switch operable by axial movement of said slidable element to deenergize said solenoid.

12. A portable power tool comprising an electric motor, a transmission, and a clutch connected therebetween; said transmission comprising two concentric rotatable members, a circular cam faced element carried by one of said members, an element carried by the other member in engagement with said cam element, one of said elements being slidable axially on its respective member and yieldingly held in abutment with the other; a spring normally holding said clutch disengaged, a solenoid for engaging the clutch against the resistance of said spring, and a switch operable by axial movement of said slidable element to deenergize said solenoid.

13. A torque applier comprising a driving member, a driven member, and a clutch coupling said members, a torque responsive clutch control mechanism for automatically disengaging said clutch at a predetermined optimum torque, universal means for coupling any one of a plurality of driving heads to said driven member in geared relation, the geared ratio between the head and said driven member being directly related to the capacity of the head and to the optimum torque transmitted thru said clutch.

14. A torque applier comprising a driving member, a driven member, and a clutch coupling said members, a torque responsive clutch control mechanism for automatically disengaging said clutch at a predetermined optimum torque, universal means for coupling any one of a plurality of driving heads to said driven member in geared relation, and a socket wrench carried by the head, the geared ratio between the head and said driven member being directly related to the diameter of the wrench socket and to the optimum torque transmitted thru said clutch.

15. A torque applying tool of the character described comprising a casing and three rotatable members carried in said casing concentric with each other, a clutch for coupling one of said members to another, a circular cam element and a cam engaging element coupling the third member to one of the clutch coupled members, one of said elements being slidable axially on its respective member and yieldingly held in abutment with the other, and means operable by axial movement of said slidable element for disengaging the clutch.

16. In a machine of the character described, comprising a motor and a chuck, an operative connection between the motor and the chuck including a master clutch, a latch restraining the master clutch in operative condition for transmitting the motion, and means axially alined with the master clutch, moved by increased load on the chuck, to release said latch and thereby render the master clutch inoperative.

17. In a machine of the character described, comprising a motor and a chuck, an operative connection between the motor and the chuck including a friction master clutch, a latch restraining the master clutch in operative condition for transmitting the motion, means moved by increased load on the chuck to release said latch and thereby render the master clutch inoperative, and manually operated means to render the master clutch initially operative, the latch including means whereby it automatically assumes its latching relation to the clutch when the clutch is rendered operative by said manually operated means.

18. In a machine of the character described, comprising a motor and a chuck, an operative connection between the motor and the chuck including a master clutch, a latch restraining the master clutch in operative condition for transmitting the motion, means moved by increased load on the chuck to release said latch and thereby render the master clutch inoperative, and manually operated means to release said latch, the load-moved means and the manually operated means being so related as to be capable of optional use to release the latch.

ARTHUR B. WEBB.